Nov. 28, 1967     T. H. DARROW     3,354,575

MINNOW DIPPER

Filed April 6, 1966

INVENTOR:

TURNER H. DARROW

BY Harrington A. Lackey
ATTORNEY

United States Patent Office 3,354,575
Patented Nov. 28, 1967

3,354,575
MINNOW DIPPER
Turner H. Darrow, 408 Rosehill Drive,
Goodlettsville, Tenn. 37072
Filed Apr. 6, 1966, Ser. No. 540,751
5 Claims. (Cl. 43—56)

ABSTRACT OF THE DISCLOSURE

A minnow dipper including a receptacle having a bottom wall and a continuous side wall, a portion of which is perforated and a portion of which is imperforate, a tubular handle connected to the imperforate wall, spaced above the bottom wall and communicating with the interior of the receptacle to permit the passage of minnows therethrough.

---

This invention relates to a minnow dipper, and more particularly to a minnow dipper provided with means for discharging one minnow at a time.

One object of this invention is to provide a minnow dipper of rigid and durable construction, and particularly adapted for removing minnows from a minnow bucket.

Another object of this invention is to provide a minnow dipper provided with means for facilitating the baiting of a fishhook with a minnow.

Another object of this invention is to provide a minnow dipper having a perforated minnow receptacle and an open-ended hollow handle connected to the receptacle for discharging one minnow at a time.

A further object of this invention is to provide a minnow dipper having a minnow receptacle and a handle attached to an imperforate wall of the receptacle, all the remaining walls of the receptacle being perforated.

Further objects and advantages of the invention will be apparent from the following description taken in conjunction with the drawings, wherein.

Figure 1:
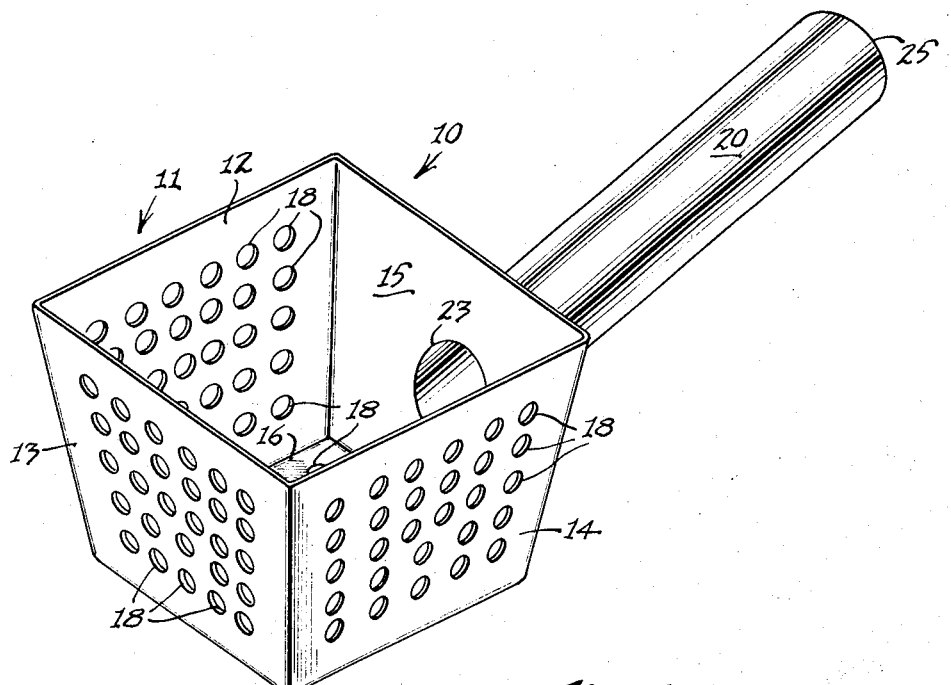
FIG. 1 is a perspective view of the invention.

Referring now to the drawings in more detail, the minnow dipper 10 made in accordance with this invention comprises a minnow receptacle 11 having continuous side walls 12, 13, 14 and 15, and a bottom wall 16. As disclosed in the drawings, the bottom wall 16 is approximately square, while each of the side walls 12–15 are uniform trapezoids connected at their adjacent edges to taper upward and outwardly from the bottom wall 16.

The side walls 12, 13 and 14 are perforated with substantially uniformly spaced holes 18 of uniform size, large enough to permit the passage of water, but small enough to eliminate the passage of minnows. The side wall 15 is imperforate for a reason to be described later.

Figure 2:
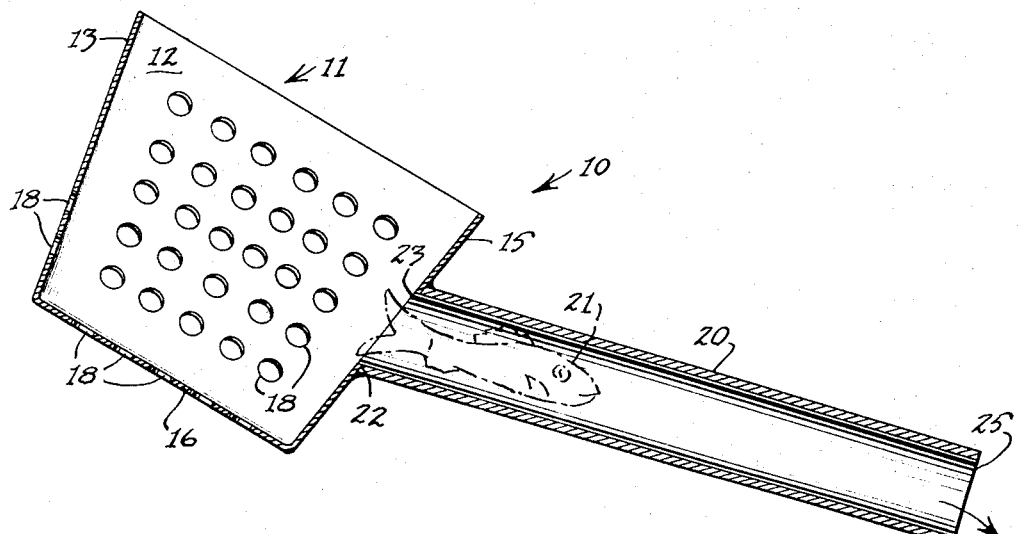
FIG. 2 is a longitudinal sectional elevation taken through the center of the receptacle and the handle, with the dipper in a minnow-discharging position.

Fixed to the imperforate side wall 15 in substantially the center thereof is an open-ended tubular handle 20 of uniform diameter, the inner diameter being sufficiently great enough to permit the free passage of an ordinary minnow 21, as disclosed in FIG. 2. The inner open end 22 of the tubular handle 20 communicates with an elliptical opening 23 of equal size so that there is free communication between the interior of the handle 20 and the interior of the receptacle 11.

As disclosed in the drawings, the tubular handle 20 is mounted on the receptacle wall 15 so that the outer end 25 is above the inner end 22, when the receptacle 11 is level. Moreover, the outer end 25 is preferably in the vicinity of, or intercepts the plane of, the open top of the receptacle 11, so that any water in the receptacle 11, and particularly when the receptacle is momentarily full, will not inadvertently discharge through the open outer end 25 of the tubular handle 20, until the dipper 10 is tipped to a position such as that disclosed in FIG. 2.

The inner end 22 of handle 20 and the opening 23 are preferably spaced sufficiently above the bottom wall 19 so that a minnow on the bottom of the receptacle 11 will not normally be discharged through the tubular handle 20, until the dipper 10 is tilted to a position similar to FIG. 2. Furthermore, the inner handle end 22 and opening 23 are spaced substantially below the top of the receptacle 11, so that when the dipper 10 is tilted to a position similar to FIG. 2, any tendency of the minnow 21 to pass over the top of the receptacle wall 15 will be reduced, and the minnow 21 will be directed through the opening 23 into the tubular handle 20.

In a preferred form of the invention, the bottom wall 16 is about 3 inches square, the height of the receptacle 11 is approximately 3 inches and the side walls 12, 13, 14 and 15 taper to an open top approximately 4 inches square. The handle 20 is approximately 6 inches long, or sufficient to be comfortably gripped by the fisherman's hand, and has an inner diameter of approximately one inch. The holes 18 are approximately one-quarter inch in diameter.

In the operation of the invention, the minnow dipper 10 will function as a part of a fisherman's apparatus or gear for removing minnows from a minnow bucket. The fisherman will grasp the handle 20 in one hand and dip the receptacle 11 into the minnow bucket until the receptacle 11 is filled with one or more minnows together with some water from the minnow bucket. As the dipper 10 is raised above the water level of the minnow bucket, the water in the receptacle 11 begins to discharge through the holes 18 in the bottom wall 16, and outwardly through the holes 18 in the side walls 12, 13 and 14. Since the wall 15 is imperforate, water will not discharge upon the hand of the fisherman holding the tubular handle 20. Moreover, since the side wall 15 is imperforate, there will be no flow of water toward the opening 23, since all the water will be moving in the other direction, downwardly through the bottom wall 16 and outwardly through the walls 12, 13 and 14. The minnows 21 will of course, tend to follow the flow of water in the receptacle 11. Therefore, no minnow 21 will enter the tubular handle 20 until the handle 20 is positively tipped downwardly as disclosed in FIG. 2. The minnow 21, may of course, more easily be controlled and directed through the opening 23 after most of the water is discharged from the receptacle 11 through the holes 18. Since the cross-sections of the opening 23 and the handle 20 are only slightly greater than the greatest cross-sectional dimension of the minnow 21, only one minnow at a time will be introduced into the handle 20 and discharged through the open end 25. The fisherman, with the other hand adjacent the outer end 25, may therefroe easily grasp the single minnow 21 sliding through the handle 20 for baiting his fishhook. If there are any minnows remaining in the receptacle 11, the dipper 10 is inverted to discharge the remaining minnows back into the minnow bucket.

It is therefore apparent that a minnow dipper 10 has been devised which will greatly facilitate the removal and selection of minnows from a minnow bucket, will facilitate the baiting of fishhooks, and consequently provide a valuable accessory to a fisherman's gear.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:
1. A minnow dipper comprising:
(a) a minnow receptacle having a perforated bottom wall, a continuous side member and an open top,
(b) one portion of said side member comprising a side wall projecting upwardly at an angle from said bottom wall having a single opening provided therein spaced above said bottom wall, said opening being substantially elliptical in shape with a greater height than width for the passage of a minnow therethrough,
(c) portions of said side member, other than said side wall, having perforations therethrough, smaller than a minnow, but large enough to permit the passage of water,
(d) an elongated tubular handle having an open inner end of substantially elliptical shape and an open outer end,
(e) the cross-section of said tubular handle being uniform and great enough for the passage of a minnow through said handle,
(f) said inner end of the handle being fixed to said side wall in alignment with said single opening so that said handle is in open communication with the interior of said receptacle, and projects at an angle from said side wall and upwardly away from said bottom wall.

2. The invention according to claim 1 in which said open inner end of the handle is spaced below said top.

3. The invention according to claim 1 in which said tubular handle is of such a length and extends at an angle such that it intersects the projected plane of said top.

4. The invention according to claim 1 in which the cross-section of said side member is polygonal, said side wall having said single opening forming one of said polygonal sides, the remaining sides of said polygonal side member comprising perforated side walls.

5. The invetnion according to claim 1 in which the distance between said bottom wall and said inner end of the handle is approximately equal to the cross-sectional height of said tubular handle.

References Cited
UNITED STATES PATENTS

| | | | |
|---|---|---|---|
| 220,576 | 10/1879 | Chillis | 141—98 |
| 2,531,551 | 11/1950 | Brecht et al. | 43—4 |
| 2,670,557 | 3/1954 | Pachner | 43—4 |

HUGH R. CHAMBLEE, *Primary Examiner.*